: 2,787,619
Patented Apr. 2, 1957

2,787,619

METHOD OF PRODUCING N-VINYL-N,N'-ETHYLENEUREA

Robert S. Yost, Oreland, Pa., assignor to Rohm & Haas Company, Philadelphia, Pa., a corporation of Delaware No Drawing. Original application April 8, 1955, Serial No. 500,300. Divided and this application December 21, 1955, Serial No. 554,402

4 Claims. (Cl. 260—309.7)

This invention relates to a new and improved process for the production of 1-vinyl-2-imidazolidinone (sometimes called simply vinylethyleneurea or N-vinyl-N,N'-ethyleneurea) of Formula I:

I
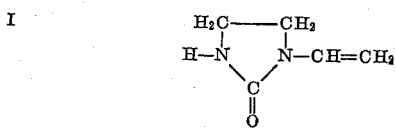

This application is a division of my copending application Serial No. 500,300, filed April 8, 1955.

The compound of Formula I is made from the quaternary ammonium compound of Formula II:

II
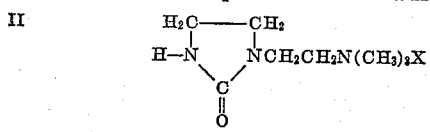

where X is a negative, salt-forming atom or radical, such as

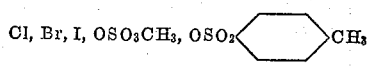

and

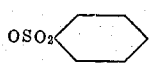

The quaternary ammonium compound of Formula II above may be obtained in either of two ways. The first method involves the exhaustive methylation of N-($\beta$-aminoethyl)-N,N'-ethyleneurea. This may be accomplished by means of a methyl halide, bromide or iodide or by other methylating agents, such as dimethyl sulfate, the methyl ester of p-toluenesulfonic acid and the methyl ester of benzenesulfonic acid. Illustratively, one mole of the amino-ethyl ethyleneurea may be reacted with three moles of the methylating agent, such as methyl chloride, in the presence of an alkaline material, such as sodium carbonate in an alcoholic solution such as in ethanol, isopropanol, amyl alcohol, n-butanol and tert-butanol. The quaternary ammonium compound is soluble in ethanol even in the cold and consequently, to facilitate separation of the product, it is preferable to use a higher alcohol such as butanol in which the product is soluble at elevated temperatures but insoluble in the cold so that, on cooling, the product may be readily precipitated and removed by filtration. The N - ($\beta$-aminoethyl) - N,N'-ethyleneurea and the alkylating agent are reacted by heating to a temperature between 60° C. and 200° C. for a time which is generally longer at the lower temperature and shorter at the higher temperature. For example, reaction is preferably carried out at reflux, and when butanol is used a period of about eight to ten hours at the reflux temperature of about 120° C. is generally adequate. At 200° C. a period of three hours may be adequate, and a period of 24 hours is generally satisfactory at about 60° C. The preferred range of temperature is from 90° to 130° C. for a period of time from seven to twelve hours. If desired, reaction may be carried out in the alcoholic solvents under superatmospheric pressure to facilitate the attainment of higher temperatures with any particular alcohol and thereby reduce the time needed.

Generally the methyl chloride or other alkylating agent may be added continuously throughout the reaction period. For example, in a batch containing about one gram mole weight of the N-($\beta$-aminoethyl)-N,N'-ethyleneurea, the methyl chloride may be added at a rate of about 250 cc. per minute throughout a ten-hour period. Completion of the reaction is readily detected by determining when carbon dioxide is no longer evolved. On completion of the reaction, the sodium chloride which is undissolved is filtered off, and the filtrate is chilled to precipitate the product when such an alcohol as butanol is used. Filtration is repeated and after an optional washing with butanol, the product may be dried either at normal room temperatures or at elevated temperatures up to 125° C.

An alternative method to produce a compound of Formula II is to react trimethylamine with N-($\beta$-chloroethyl)-N,N'-ethyleneurea of Formula III (a new compound) obtained as hereinafter described:

III
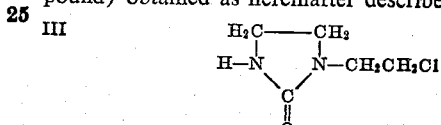

The reaction of the urea of Formula III with the trimethylamine may be effected in a solvent for the urea, such as benzene, toluene, xylene, or even in water or alcohols such as the alcohols mentioned above. The temperature of reaction may be from room temperature for a period of 24 hours or more up to 200° C. for a period of 15 minutes or so. Preferably the reaction is effected at a temperature of 80° C. to 120° C. for one to eight hours or more, particularly at 100° C. for three to six hours. The quaternary product is insoluble in the hydrocarbon solvents mentioned so that it may be removed merely by filtration. The filtered product may optionally be washed with benzene or other hydrocarbon solvent and may then be dried at room temperature or at somewhat elevated temperature up to 120° C.

If desired, reaction may be effected under pressure such as at about 25 pounds per square inch gauge to obtain higher temperature for a given solvent. The pressure mentioned for example is adequate to raise the temperature to about 100° C. when the reaction is effected in benzene, or in the alcohols.

The N-($\beta$-chloroethyl)-N,N'-ethyleneurea of Formula III is preferably prepared by reacting thionyl chloride (SOCl$_2$) with N - ($\beta$-hydroxyethyl) - N,N'-ethyleneurea. The two reactants may be used in approximately equimolar amounts and reaction is preferably effected with the urea dissolved in cholorform. Preferably the thionyl chloride is added gradually. For example, when the reaction involves a batch containing about two moles of the urea, the thionyl chloride may be added over a period of two hours. The reaction is preferably effected at a temperature of 30° C. to 100° C. Advantageously, it may be carried out with the chloroform at reflux at a temperature of about 58° to 66° C. After completion of the addition of the thionyl chloride, the chloroform may be gradually distilled while introducing toluene until the temperature in the vessel reaches about 105° to 109° C. It is then refluxed for about 20 hours in the toluene. The product (Formula III) is soluble in the hot toluene which is cooled to about 5° to 10° C. or lower to precipitate the compound of Formula III. The precipitated product may then be filtered and, if desired, washed with cold toluene. It is then air-dried or dried under a vacuum at room temperature. It has a melting point of 82° to 83° C.

To produce the vinyl urea of Formula I, a quaternary ammonium compound of Formula II is dissolved in an alcohol, such as ethanol, isopropanol, amyl alcohol, n-butanol, t-butanol, or preferably in methanol. Then an alkaline material such as sodium hydroxide, potassium hydroxide, sodium methoxide, or potassium methoxide is added in the exact molar equivalent amount. Preferably for the best yields one of the methoxides, such as sodium methoxide, is employed and it may be added as solid sodium methoxide or as a 25% solution in methanol. If another alkali is employed, the corresponding alkali metal alkoxide may be used or the methoxide as well. For simplicity, the following description refers to the use of methanol and sodium methoxide but it applies as well when another alcohol and alkoxide are used. Under reduced pressure, such as that which may be obtained with a water-aspirator, the methanol is stripped off keeping the temperature below about 40° C. Then an anhydrous hydrocarbon solvent, such as toluene, benzene, xylene or petroleum ether, is added. It is generally unnecessary to add a polymerization inhibitor to prevent polymerization of the product of Formula I, but, if desired, a polymerization inhibitor may be added to the reaction medium in an amount equal to about 1%, on the weight of the monomeric product expected to be produced in the reaction. Among the inhibitors that may be employed are hydroquinone, the methyl ether of hydroquinone, and N-(p-hydroxyphenyl)-aniline. After the addition of the anhydrous hydrocarbon solvent, or after the addition of the inhibitor, if the latter is added, the reaction medium is heated to strip off the trimethylamine and the methanol that are split out. This stripping of the amine and the methanol is carried on continuously until the temperature reaches about 92° to 96° C. at which time the reaction mass is swept with toluene until the temperature in the reaction vessel reaches 110° C. The period of time required to attain the 110° C. temperature depends on the size of the batch and may be about one to two hours for a batch starting with one mole of the quaternary compound.

The reaction mass is then filtered hot or cold to remove the salt (sodium chloride or potassium chloride). The filtrate obtained is a solution in toluene or other hydrocarbon of the vinyl urea of Formula I in equilibrium with more or less of N-($\alpha$-methoxyethyl)-N,N'-ethyleneurea which latter compound on distillation in the presence of an alkali metal alkoxide, such as sodium methoxide, is converted to additional N-vinyl-N,N'-ethyleneurea with liberation of an alkanol, such as methanol. Generally, a substantial proportion of sodium methoxide or other alkoxide is carried through the filter into the filtrate, but additional methoxide or alkoxide may be added, if desired, such as from 0.1 to 10%, and preferably about 1%, on the weight of the filtrate. When an alkali metal t-butoxide is used, the amount of N-($\alpha$-t-butoxyethyl)-N,N'-ethyleneurea obtained is very small and the N-vinyl-N,N'-ethyleneurea is obtained almost exclusively as the product in the filtrate. The insoluble N-vinyl-N,N'-ethyleneurea dimer (M. P. 164°–164.5° C.) is also recovered from the salt mass collected on the filter by extraction with methanol. The vinyl urea of Formula I may be recovered from the filtrate by stripping off toluene and any alkanol, such as methanol, liberated and, if desired, to assure that no polymerization of the vinyl urea occurs, additional inhibitor may be added before or during the stripping operation but the use of inhibitor is usually unnecessary. For further purification, the vinyl urea of Formula I may be distilled in a vacuum. Its boiling point is 100° to 110° C. at 0.2 mm. of mercury. After distillation, it is found to be crystalline in character and it may be recrystallized for further purification from hexane or ether.

By this procedure involving the removal of trimethylamine and hydrogen chloride from the quaternary ammonium compound of Formula II, the yield of the vinyl urea of Formula I is generally on the order of 60% to 85%. The vinyl urea is also readily removed from the reaction mass and can easily be purified. It is unaccompanied by any divinyl substituted ethyleneureas which are always obtained in more or less large amounts when the vinyl urea is produced by the reaction of acetylene with N,N'-ethyleneurea as previously suggested. Frequently, the divinyl urea compound is obtained in larger yield than the monovinyl urea compound by this prior process.

In the following examples, which are illustrative of the invention, the parts and percentages are by weight unless otherwise noted:

*Example A*

In a reaction vessel fitted with stirrer, reflux condenser, thermometer and gas inlet tube were placed 66.5 parts of N-($\beta$-aminoethyl)-N,N'-ethyleneurea (97% pure), 400 parts of n-butyl alcohol and 53.0 parts of anhydrous sodium carbonate. The mixture was heated to reflux and gaseous methyl chloride was passed in at the rate of about 0.5 to 0.6 part by weight per minute. Refluxing and the introduction of methyl chloride was continued until the evolved gas contained no carbon dioxide (as indicated by the lime-water test) (ten and one-half hours). The hot reaction mixture was filtered to remove sodium chloride and the filtrate was chilled in an ice bath to precipitate the product. Subsequent filtration yielded 86.5 parts (an 83.5%) yield of $\beta$-(N,N'-ethyleneureido)ethyltrimethylammonium chloride as colorless crystals, M. P. 228° to 229° C. Recrystallization from isopropyl alcohol gave a product melting at 230° C.

*Anal.*—Calculated for $C_8H_{18}ON_2Cl$: Cl, 17.1%. Found: Cl, 17.1%.

*Example B*

In a stainless steel, stirrer-equipped autoclave were placed 74.0 parts of N-($\beta$-chloroethyl)-N,N'-ethyleneurea, 59 parts of liquified anhydrous trimethylamine and 264 parts of anhydrous benzene. The autoclave was sealed and the mixture was stirred and heated at 100° to 105° C. for six hours. The product which was insoluble in benzene was separated by filtration and recrystallized from isopropyl alcohol. Yield: 90.2 parts (an 87.8% yield) of $\beta$-(N,N'-ethyleneureido)ethyltrimethylammonium chloride which melted at 230° C.

*Example 1*

In a reaction vessel fitted with condenser and receiver for distillation were placed 62.3 parts of $\beta$-(N,N'-ethyleneureido)ethyltrimethylammonium chloride, 120 parts of methanol and 63.8 parts of 25.4% methanolic sodium methoxide. The methanol was distilled in vacuo (water aspirator), while maintaining the temperature of the contents of the vessel below 40° C. Anhydrous toluene (130 parts) and 0.33 part of N,N'-di-2(1,4-naphthoquinonyl)-p-phenylenediamine (as an inhibitor) were added. The resulting mixture was heated at atmospheric pressure and trimethylamine and methanol were evolved. Distillation was carried on until the vapor temperature reached about 90° C. at which point fresh toluene was added at the same rate at which distillate was removed. When the vapor temperature reached 108° C., the mixture was filtered to remove sodium chloride (18 parts). The toluene was stripped from the filtrate in vacuo and the residue was distilled through a short Vigreux column. One fraction, weighing 27.8 parts (an 83% yield) was collected; B. P. 100° to 110° C. at 0.2 mm. of mercury. The product crystallized on standing. After recrystallization from hexane, the colorless crystalline compound melted at 78° to 79° C.

*Anal.*—Calculated for $C_5H_8ON_2$: C, 53.55%; H, 7.19%; N, 24.99%. Found: C, 53.34%; H, 7.05%; N, 25.03%.

Example 2

In a reaction vessel fitted with condenser and receiver for distillation were placed 207.5 parts of β-(N,N'-ethyleneureido)ethyltrimethylammonium chloride, 320 parts of methanol, and 212.4 parts of 25.4% methanolic sodium methoxide. The methanol was distilled in vacuo (water aspirator) while maintaining the temperature of the contents of the vessel below 50° C. Anhydrous toluene (350 parts) was added. The resulting mixture was heated at atmospheric presure and trimethylamine and methanol were evolved. Distillation was carried on until the vapor temperature reached about 90° C. at which point fresh toluene was added at the same rate at which distillate was removed. When the vapor temperature reached 208° C., the mixture was filtered to remove sodium chloride (60 parts). The toluene was stripped from the filtrate in vacuo and the residue, after addition of 2.2 parts of solid sodium methoxide, was distilled through a short Vigreux column. Methanol was evolved for a period of about fifteen minutes during which time the pressure in the system could not be reduced below 2.5 mm. of mercury. When methanol evolution was complete, the pressure dropped to 1 mm. and the product (81 parts) distilled at 107.5 to 126.5° C. The product crystallized on standing. Recrystallization from ether yielded 72 parts (a 64% yield) of colorless crystalline compound which melted at 78° to 79° C.

I claim:

1. A method for producing N-vinyl-N,N'-ethyleneurea which comprises heating a β-(N,N'-ethyleneureido)-ethyltrimethylammonium salt in an anhydrous solvent to a temperature of about 40° C. to about 110° C. with a molar equivalent of an alkaline material selected from the group consisting of alkali metal hydroxides and alkali metal alkoxides of alcohols having 1 to 5 carbon atoms, thereby distilling off the trimethylamine and methanol formed, and separating the N-vinyl-N,N'-ethyleneurea from the solvent.

2. A method for producing N-vinyl-N,N'-ethyleneurea which comprises heating a β-(N,N'-ethyleneureido)ethyltrimethylammonium salt in an anhydrous solvent to a temperature of about 40° C. to about 110° C. with a molar equivalent of an alkali metal alkoxide of an alcohol having 1 to 5 carbon atoms, thereby distilling off the trimethylamine and methanol formed, and separating the N-vinyl-N,N'-ethyleneurea from the solvent.

3. A method for producing N-vinyl-N,N'-ethyleneurea which comprises heating β-(N,N'-ethyleneureido)ethyltrimethylammonium chloride in an anhydrous hydrocarbon solvent to a temperature of about 40° C. to about 110° C. with a molar equivalent of an alkali metal alkoxide of an alcohol having 1 to 5 carbon atoms, thereby distilling off the trimethylamine and methanol formed, filtering to remove sodium chloride, distilling the hydrocarbon solvent, and then distilling the N-vinyl-N,N'-ethyleneurea in the presence of an alkali metal alkoxide of an alcohol having 1 to 5 carbon atoms.

4. A method for producing N-vinyl-N,N'-ethyleneurea which comprises heating β-(N,N'-ethyleneureido)ethyltrimethylammonium chloride in anhydrous toluene to a temperature of about 40° C. to about 110° C. with a molar equivalent of sodium methoxide, thereby distilling off the trimethylamine and methanol formed, filtering to remove sodium chloride, distilling the toluene, and then distilling the N-vinyl-N,N'-ethyleneurea in the presence of sodium methoxide.

References Cited in the file of this patent

UNITED STATES PATENTS 2,541,152     Cairns  ---------------- Feb. 13, 1951